Dec. 18, 1956   B. VONNEGUT   2,774,652
HALOGEN VAPOR DETECTOR
Filed Sept. 22, 1951
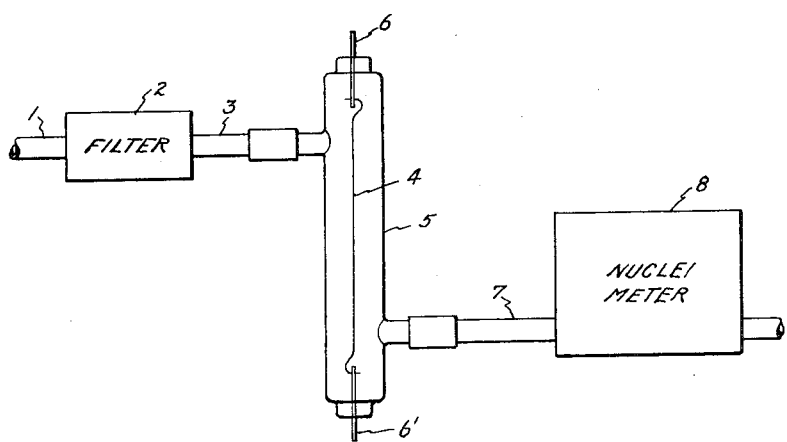
Inventor:
Bernard Vonnegut,
by Paul A. Frank
His Attorney.

2,774,652
Patented Dec. 18, 1956

2,774,652

HALOGEN VAPOR DETECTOR

Bernard Vonnegut, Alplaus, N. Y., assignor to General Electric Company, a corporation of New York Application September 22, 1951, Serial No. 247,864

1 Claim. (Cl. 23—232)

The present invention relates to gas analysis and provides a method of detecting and estimating the relative amounts of minor foreign components in a gaseous atmosphere as, for example, the presence of traces of impurities, such as halogen, or hydrocarbon gas in air, or, as another example, the presence of traces of oxygen or water vapor in inert industrial gases, such as helium or argon.

In accordance with my invention, minor foreign gaseous components in a gas are caused to form condensation nuclei under controllable conditions; the nuclei in turn are caused to function as condensation centers for a vapor with the result that a cloud of small droplets is formed whereby the relative amount of the minor component may be determined.

My invention will be more fully described in connection with the accompanying drawing which shows conventionally a system containing means for the formation of condensation nuclei and including also means for the estimation of resulting droplet formation.

In an article by H. Landsberg in Ergebnisse der Kosmischen Physik, vol. III (1938), pages 155 to 252, published by Akademische Verlagsgesellschaft m. b. H., Leipzig (and available at the Library of Congress), condensation nuclei are described as microscopic or submicroscopic particles suspended in air, or other gas bodies, on which condensation of vapor occurs under favorable conditions. Ordinarily, it is the condensation of water vapor from air at the dew point which is of interest in the functioning of such nuclei.

In carrying out my invention, a gas believed to contain a minor component, or impurity, is freed from naturally occurring condensation nuclei and then is brought into contact with a means for converting the component to be estimated into finely divided smoke particles which then serve as condensation nuclei. For example, the gas is brought into contact with an electrically-heated body with which the component to be estimated or detected either combines chemically to form smoke particles which serve as condensation nuclei, or the material to be detected may be condensed or absorbed on a heatable body and subsequently revolatilized to form the smoke particles which function as condensation nuclei. In either case, the finely divided smoke particles which function as condensation nuclei are made evident by the condensation of liquid droplets thereon.

Referring to the drawing, the gas to be tested, as, for example, atmospheric air which is suspected to contain chlorine or other halogens, enters the system by a conduit 1, passes through a filter 2, and passes through a conduit 3 into contact with a filament 4 in a sealed tube 5. This filament, which may consist of platinum, is connected to conductors 6, 6', whereby the filament may be supplied with electric energy in order to heat it to a desired temperature.

Assuming the filament 4 is heated to a temperature of approximately 500 to 800° C. and the filter 2 contains glass wool, or, in general, fiber-type material, the filter will remove any naturally occurring finite particles supported in the gas which could serve as condensation nuclei, while allowing components in the gaseous state to pass through unarrested. Hence, no finely divided smoke particle which would serve as condensation nuclei are produced by the filament 4 unless there are traces of halogen in the air being admitted through the conduit 1.

If traces of halogen are present, finely divided smoke particles are formed which can serve as condensation nuclei and hence are hereinafter referred to as condensation nuclei. The condensation nuclei are formed apparently by chemical interaction of the halogen and the heated platinum to produce a platinum halide which is more volatile than metallic platinum and appears as finely divided smoke particles. The condensation nuclei thus formed pass with the current of air from the chamber 4 through a conduit 7 into a nuclei meter 8 of standard construction for producing liquid droplets around the condensation nuclei in order to determine the concentration thereof. For this purpose, the air to be tested containing the condensation nuclei is conveyed through the conduit 7 into a humidifier forming part of the nuclei meter 8. The humidifier comprises a receptacle containing a humidifying liquid which may consist of water. The air, containing the suspended nuclei, when passing into contact with or through the humidifying liquid, becomes charged with the vapor of the humidifying material. The humidified air is then expanded adiabatically to cause the vapor with which it is charged to condense as droplets on the condensation nuclei which may then be counted or estimated. A suitable nuclei meter is described in "Proceeding of the First National Air Pollution Symposium," published in March 1950, pages 37 and 38, and in application Serial No. 129,091, Bernard Vonnegut, filed November 23, 1949, now Patent No. 2,684,008, issued July 20, 1954, and assigned to the General Electric Company, and includes a humidifier which forms a part thereof. An expansion chamber is provided for accomplishing adiabatic expansion of the air, or other gas, and has observation ports therein through which light is passed to a photocell measuring device. Condensation of the humidified vapor then occurs about the condensation nuclei as centers, to form a cloud within the chamber which scatters the light passing through the observation ports. The light scattered by the cloud is measured by a photomultiplier device to provide an indication of the number of condensation nuclei as disclosed in the above-identified publication and patent. This information can then be interpreted to provide a measure of the quantity of halogen vapor in the air being monitored.

Various other means may be used for determining the amount of condensation or droplets formation on the nuclei, such as an Aitken Counter.

Another example of a field of usefulness of my invention is the determination of traces of oxygen in helium gas. In that case, a filament of metallic molybdenum should be substituted for the platinum filament. Traces of water vapor, when present as an undesired impurity in argon or other gases to be employed as a filling for lamps or electron discharge devices, may be similarly estimated. When, for example, helium or argon containing oxygen or water vapor is brought into contact with an incandescent filament of tungsten or molybdenum, these impurities react with the filament and condensation nuclei are formed on which, by condensation, droplets of liquid are collected and metered as heretofore described in connection with halogen impurities.

It is not always necessary that chemical reaction should occur between the foreign component of a gas and a solid body, for substantially the same effect can be achieved by condensation of the foreign components on the solid body, and subsequent revolatilization thereof to form the desired condensation nuclei.

When it is desired to estimate the content of hydrocarbon vapors in air, the air to be tested after being freed of undesired condensation nuclei, is brought into contact with a material on which the hydrocarbons will be collected by adsorption. A platinum filament will serve for this purpose in an apparatus such as shown in the drawing. A measured amount of air, or other gas, containing a component capable of being collected by adsorption, or otherwise, on the filament is caused to come into contact with a metal which may be unheated. Thereupon, the metal is heated by passage of current or otherwise to a sufficiently high temperature to volatilize the adsorbed material, thereby forming condensation nuclei which are humidified, condensed into droplets, and their number estimated as heretofore described.

What I claim as new and desire to secure by Letters Patent of the United States is:

The method of measuring the relative amount of halogen in a gas which comprises freeing said gas from condensation nuclei which may be present, bringing a volume of said gas into contact with a platinum surface heated to a temperature of about 500 to 800° C. whereby condensation nuclei composed of platinum halides are formed by chemical interaction of halogen with said heated platinum, humidifying said volume of gas, condensing water vapor about said condensation nuclei to form a droplet cloud, irradiating said droplet cloud with a beam of light to indicate the amount of scattering of light by said droplet cloud as a measure of said halogen.

References Cited in the file of this patent

UNITED STATES PATENTS

| | | |
|---|---|---|
| 1,143,889 | Carr | June 12, 1915 |
| 1,789,268 | Anderson | Jan. 13, 1931 |
| 2,194,520 | Darrah | Mar. 26, 1940 |
| 2,429,474 | McMahon | Oct. 21, 1947 |

FOREIGN PATENTS

| | | |
|---|---|---|
| 417,116 | Great Britain | Sept. 28, 1934 |
| 484,144 | Great Britain | May 2, 1938 |

OTHER REFERENCES

Coste et al.: The London, Edinburgh and Dublin Philosophical Magazine, 7th series, vol. 20, July–December (1935), pages 209–234.

Neuberger: Mechanical Engineering, vol. 70, No. 3 (1948), pages 221–225.

General News Bureau, G. E. Bulletin, released, November 10, 1949.

Proceedings of the First National Air Pollution Symposium, presented November 10, 11, 1949, Huntington Hotel, Pasedena, Calif., pages 36–43 cited.